May 13, 1958   J. T. GRUETZNER   2,834,231
THREE-DIMENSIONAL OPTICAL DIE MAKING METHOD AND DEVICE
Filed Oct. 24, 1952   4 Sheets-Sheet 1
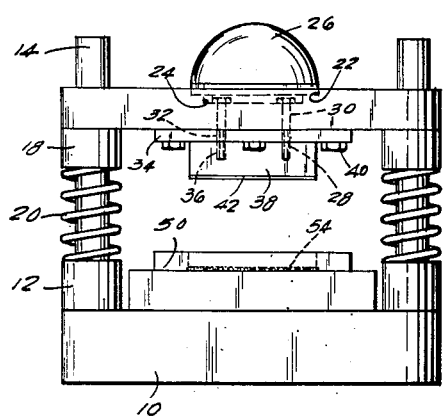
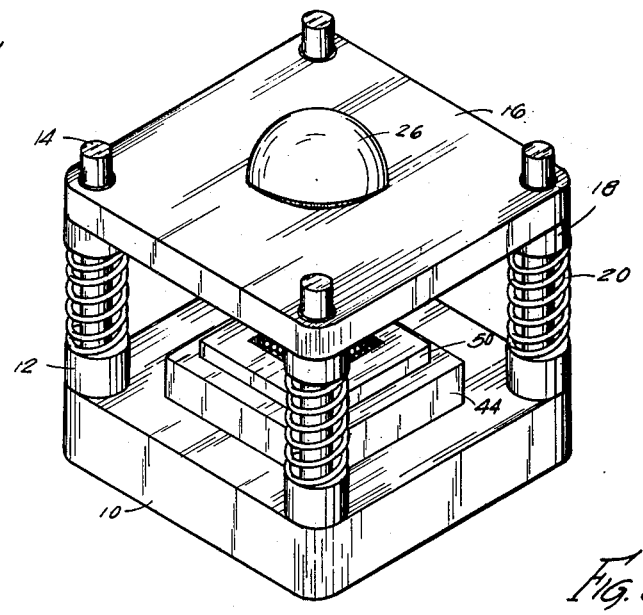
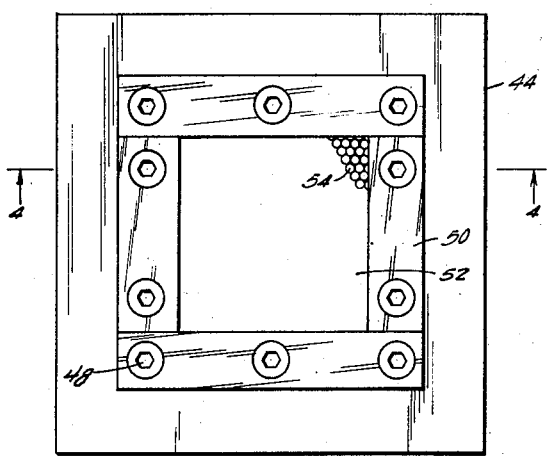
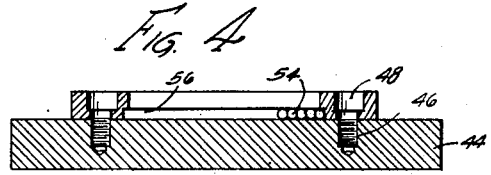
INVENTOR.
JOHN T. GRUETZNER
BY
H H Grainger
ATTORNEYS

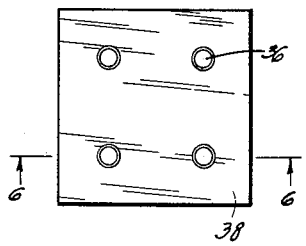
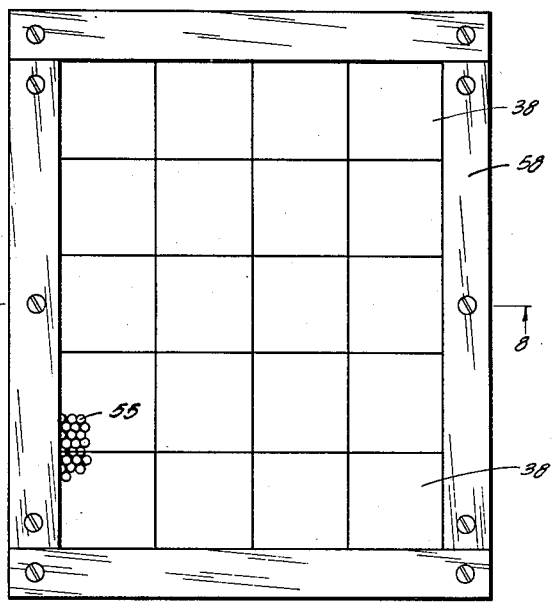
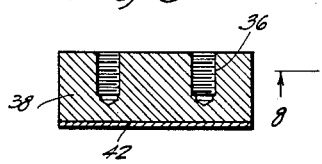
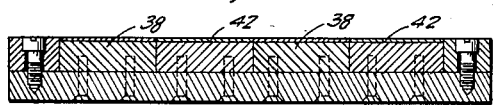
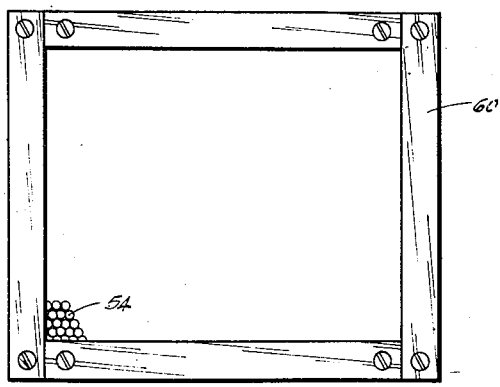

May 13, 1958  J. T. GRUETZNER  2,834,231
THREE-DIMENSIONAL OPTICAL DIE MAKING METHOD AND DEVICE
Filed Oct. 24, 1952  4 Sheets-Sheet 3
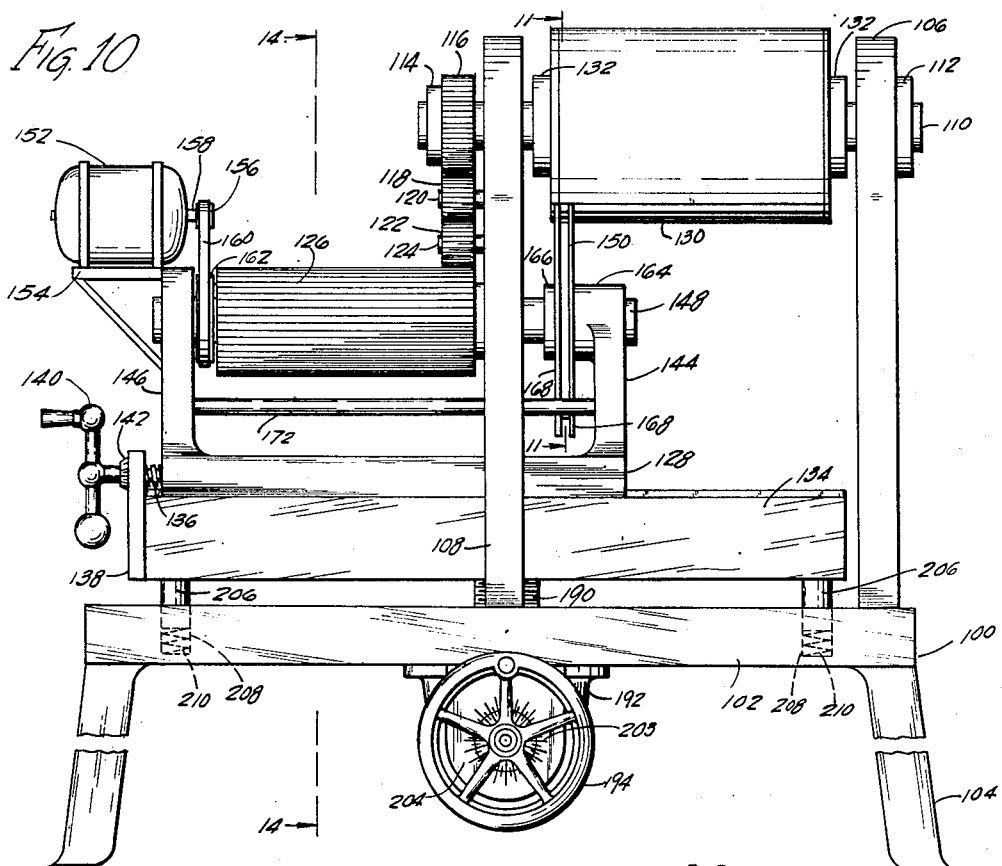
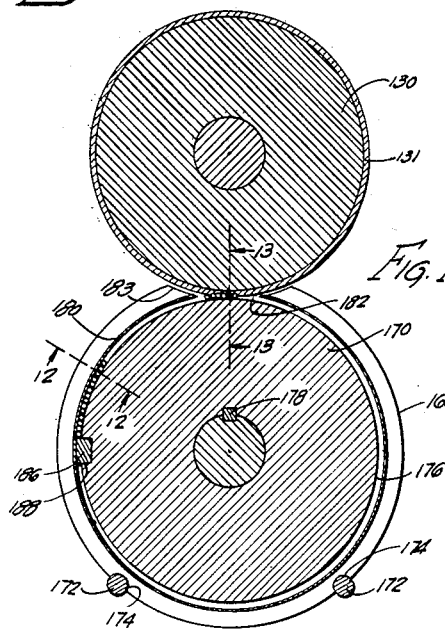
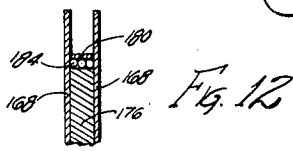
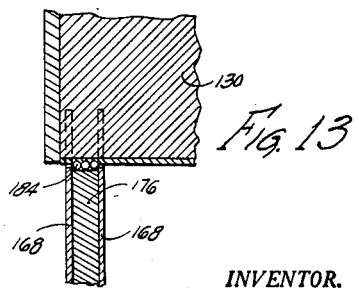
INVENTOR.
JOHN T. GRUETZNER
BY
H H Cannaugh
ATTORNEYS May 13, 1958 J. T. GRUETZNER 2,834,231
THREE-DIMENSIONAL OPTICAL DIE MAKING METHOD AND DEVICE
Filed Oct. 24, 1952 4 Sheets-Sheet 4

INVENTOR.
JOHN T. GRUETZNER
BY
H H Grueninger
ATTORNEYS

United States Patent Office 2,834,231
Patented May 13, 1958

2,834,231

THREE-DIMENSIONAL OPTICAL DIE MAKING METHOD AND DEVICE

John T. Gruetzner, Audubon, N. J.

Application October 24, 1952, Serial No. 316,820

13 Claims. (Cl. 76—107)

(Granted under Title 35, U. S. Code (1952), sec. 266)

The invention described herein may be manufactured and used by or for the Government of the United States of America for governmental purposes without the payment of any royalties thereon or therefor.

The invention relates to photography, and it particularly relates to the process of making a photographic or optical surface such as a film or a reflecting screen, which will have the quality of providing a three-dimensional image.

As described in applicant's co-pending patent application, Serial Number 286,592, filed May 7, 1952, which has issued as Patent No. 2,724,312, when a pattern of minute closely related spherical lenses is provided on one surface of a photographic film base, each of these lenses is adapted to focus the light beams accurately on the emulsion on the opposite surface of the film base. The spherical shape of the lenses enables depth to be registered from all angles of view.

An essential characteristic of this type of film is that the lenses be very closely related one to another and should, if possible, actually be tangent to each other. The reason that this close relationship is necessary is that only the lens elements will three-dimensionally reflect the light beams, and any space been such lens elements will provide a three-dimensional blind-spot. Since the lens elements are necessarily very minute, varying from approximately one-thirty-second of an inch to one-sixty-fourth of an inch in diameter, a single frame of the film would be covered with many thousands of such lens elements. It is, therefore, readily seen that in a single film frame the spacing between individual lens elements, no matter how small such spacing may be between any two lens elements, would, in the aggregate, substantially effect the qualities of the film. It is, furthermore, necessary that these lens elements be perfectly spherical in shape and free from any distortion. It is, therefore, highly important that a method be devised whereby the lens elements may be embossed on a film base in such a manner that each of the lens elements is free from distortion and is substantially tangent to each of the lens elements adjacent thereto. It is to this method and to the means for accomplishing this method that the present invention relates.

One object of this invention, therefore, is to provide a photographic surface having a plurality of minute, undistorted, spherical-shaped lens elements situated thereon in substantial tangency to one another.

Another object of this invention is to provide a method of forming a die for impressing closely related, undistorted, spherical lens-elements on a photographic surface.

Another object of this invention is to provide a means for forming a die for impressing the above-mentioned lens elements on the photographic surface.

Another object of this invention is to provide a means for forming a lens embossing die in such a manner that the resulting lens elements on the photographic surface are substantially tangent, one to another, but are yet not distorted.

Other objects and many of the attendant advantages of this invention will be readily appreciated as the same becomes better understood by reference to the following detailed description considered in connection with the accompanying drawings wherein:

Fig. 1 is a perspective view of one embodiment of the invention.

Fig. 2 is a side elevational view of the invention shown in Fig. 1.

Fig. 3 is a top plan view of the tool for impressing the lens shapes in the die.

Fig. 4 is a cross-sectional view taken on line 4—4 of Fig. 3.

Fig. 5 is a top plan view of a die-plate section.

Fig. 6 is a cross-sectional view taken on line 6—6 of Fig. 5.

Fig. 7 is a top plan view of a complete die-plate.

Fig. 8 is a cross-sectional view taken on line 8—8 of Fig. 7.

Fig. 9 is a top plan view of a modification of the die-plate shown in Fig. 8.

Fig. 10 is a front elevational view of a second embodiment of the invention.

Fig. 11 is a sectional view taken on line 11—11 of Fig. 10.

Fig. 12 is a cross-sectional view taken on line 12—12 of Fig. 11.

Fig. 13 is a cross-sectional view taken on line 13—13 of Fig. 11.

Figure 14:
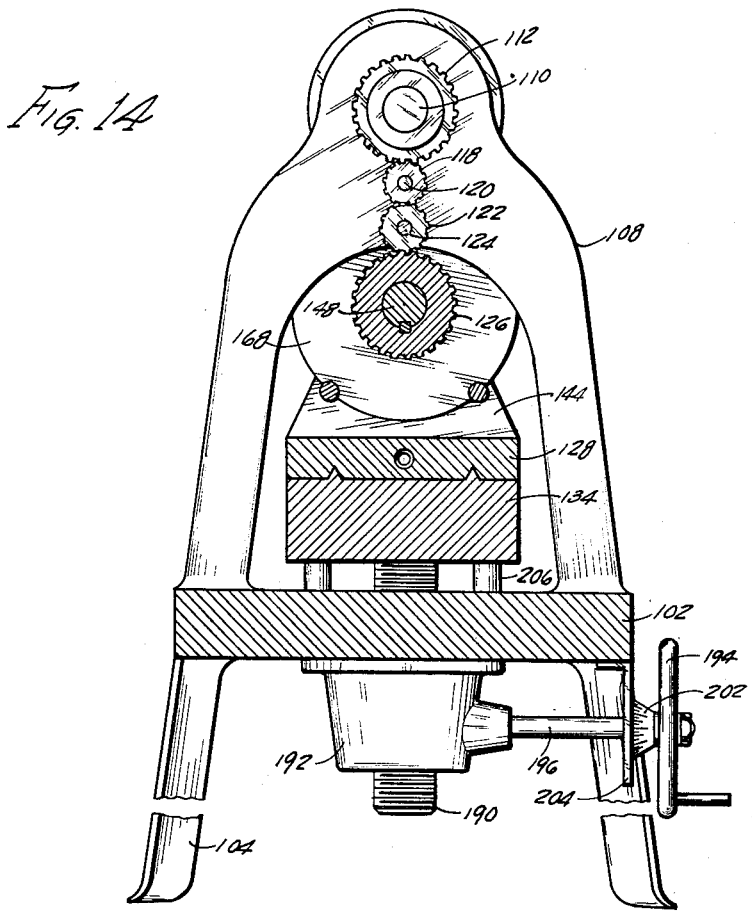
Fig. 14 is a side view taken on line 14—14 of Fig. 10.

Referring now in greater detail to the drawings wherein similar reference characters refer to similar parts, there is shown in Fig. 1 a base 10 of generally square shape having a hollow cylindrical boss 12 upstanding from each corner thereof. Rigidly held within the bores of each of the bosses 12 is a column or post 14 upon which is adapted to vertically slide a plate 16 of a shape similar to base 10. The plate 16 is provided with depending hollow, cylindrical bosses 18, one in each corner, these bosses 18 being adapted to slideably engage the posts 14. A coil spring 20 surrounds each post 14 and abuts against its corresponding boss 12 at one end and its corresponding boss 18 at its other end.

A circular recess 22 is centrally provided in the top surface of plate 16 and concentric with the recess 22 is a counter-bore or recess 24 which is of generally square shape. A hemispherical abutment means 26 is mounted on the top of plate 16, its flat bottom portion being freely received within the recess 22. The recess 24 is adapted to receive the heads of a plurality of screws 28 which extend through coinciding bores 30 and 32 respectively situated in the plate 16 and in a work clamping member 34 and which extend into screw-threaded holes 36 in a die plate 38, the die plate forming the workpiece herein. The work clamp 34 is attached to the plate 16 by bolts 40 and, thereby, clamps the die-plate 38 in position on the plate 16. The working surface of the die-plate is ground to a mirror finish and is coated with a thin silver coating 42.

Centrally mounted on the base 10 is a tool support 44 which is provided with screw-threaded openings 46 for threadedly receiving mounting screws 48. The screws 48 are adapted to hold four elongated blocks 50 in position on the support 44 in such a manner that they form a substantially square recess 52 of a size to slidably receive the work-piece 38. Although not so illustrated, the support 44 may be provided with a plurality of rows of openings 46, some in parallel and some in perpendicular arrangement to other rows, so that the blocks 50 may be finely adjusted to vary the size of the recess 52 and then held in such positions by screws 48, in the event of variations in the size of the work-piece 38.

Within the recess 52 there is provided a large number of tiny steel balls 54. These balls should be of very small diameter. At present, there are few balls made which have a diameter smaller than one-sixty-fourth of an inch, although it is possible to obtain balls having a diameter which is even less than one-sixty-fourth of an inch. The smaller the size of the ball, the more effective is the result although very good results are obtainable even with the balls presently available. The balls 54 are closely packed together in a single layer wherein each ball is in bodily contact with each of the balls adjacent thereto.

The blocks 50, as best seen in Fig. 4, are recessed at their lower, inner edges as shown at 56, the height of these recesses being barely larger than the diameter of one of the balls 54 and the width of the recesses being one-half the diameter of the ball. In this way, when the work-piece is brought into contact with the balls which form the working surface of the tool, the impressions 55 made by the balls on the silvered surface 42 of the work-piece will be concave and spherical, corresponding to the shapes of the balls, and these impressions will be as close to one another as are the balls 54 themselves. However, at the edges of the work-piece surface, the impressions will be only half the size of the impressions formed in the center of the work-piece surface because of the overhanging ledge formed by the recesses 56. This is important because when a die-plate 58 such as shown in Fig. 7 is made up, it consists of a number of sections 38 laid side by side. By mating half impressions which are exactly alike at the edges of each section, no line of demarcation between the sections is apparent. The reason for making the die-plate 58 of a number of sections is that the minute balls 54 are difficult to obtain and expensive to buy and since many thousands of such balls are necessary for each small area, the difficulties and expense incurred in obtaining sufficient balls to cover an area of the size of the die-plate 58 would be prohibitive. However, if cost is no object, it is possible that the required number of such balls may be obtained, in which event, a die-plate, such as shown at 60 in Fig. 9, having impressions 61, may be constructed, wherein the entire die-plate is formed in one operation just as is each section 38.

The operation of the device is as follows:

The entire mechanism, as shown in Fig. 1, may be placed between the upper and lower work surfaces of a punch-press or it may be made part of a separate mechanism. In either case, the top plate of the press or a similar means on the separate mechanism is brought down against the apex of the spherical surface 26 and forces the top plate 16 and its work-piece down toward the tool against the force of the springs 20. The bosses 12 act as stops to limit the downward movement of the plate 16 when the bosses 18 abut against bosses 12. In this way, the depth of the impressions made by the balls 54 on the silvered surface 42 is kept constant for all the work-pieces since the sizes of the bosses 12 and bosses 18 remain constant.

By imposing the downward force at the apex of the spherical member 26, the force is evenly distributed throughout the work surface since the member 26 is freely held within the recess 22 and any variation of the force will be compensated by the play within this recess.

After the completion of the downward work stroke, the springs 20 act to lift the upper plate 16 from the base, after which the engraved work-piece can be removed and a new work-piece clamped in position for the next work stroke of the machine.

Figure 15:
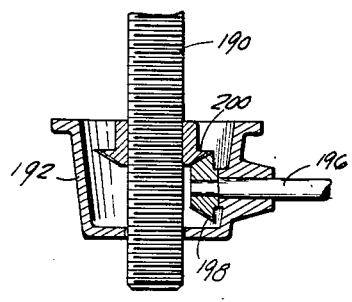
Fig. 15 is a sectional view of the gear housing shown in Fig. 14.
Figure 16:
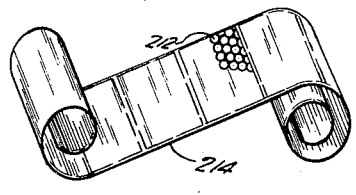
Fig. 16 is a perspective view of a strip of film showing a portion of the film embossed with the spherical lens elements which are here shown in greatly exaggerated size for purposes of clarity.

A modification of the die making machine set forth above is illustrated in Figs. 10 to 15, inclusive. This embodiment of the invention is adapted to form a roller type of die instead of the plate die set forth above. The machine for accomplishing this purpose comprises a stand 100 which includes a support base 102 and legs 104. Upstanding from the base 102 is a pair of spaced, generally U-shaped work supporting standards 106 and 108.

A bearing portion is formed at the top of each of these standards and rotatably mounted in these bearing portions is a shaft 110. The shaft is provided with collars 112 and 114 at either end, outwardly of the standards 106 and 108 in order to prevent axial movement of the shaft. A gear 116 is provided on the shaft adjacent the collar 114, and this gear is adapted to mesh with a gear 118 mounted on a shaft 120 extending from the standard 108. The gear 118 is, further, adapted to mesh with a gear 122 mounted on a shaft 124 on the standard 108. The gear 122 is, in turn, adapted to mesh with an elongated drive gear 126 mounted on a slidable tool carriage 128, having a rotatable tool thereon which is adapted to operate upon a work-piece 130 mounted on the shaft 110 intermediate the standards 106 and 108. This work-piece is in the form of a roller-die having a silver coating 131 on its periphery. The roller-die 130 is held in position on the shaft 110 by means of a pair of collars 132.

The tool carriage 128 is slidable on a bed 134 by means of a screw-rod 136 which extends through a flange 138 on one edge of the bed 134 and which is provided with a hand wheel 140. A dial 142 is provided on the rod 136 outwardly of the flange 138 and this dial coincides with an indicating means on the flange which is not here illustrated.

The tool carriage 128 is, further, provided with a pair of support arms 144 and 146 in which a shaft 148 is rotatably mounted. The gear 126 is positioned on this shaft 148 in spaced relation to a tool 150. The shaft 148 is driven by a motor 152 mounted on a motor support 154 attached to the supporting arm 146. A motor pulley 156, mounted on the motor shaft 158, drives the shaft 148 through a belt 160 and a pulley 162 mounted on the shaft 148 between the gear 126 and the supporting arm 146.

The tool 150 is mounted on the shaft 148 between the bearing 164 integral with the supporting arm 144 and a collar 166. The tool comprises a pair of discs 168 between which is provided the working tool portion 170 which has a substantially larger diameter than the work-piece. The discs 168 are freely mounted on the shaft 148 and are prevented from rotating therewith by a pair of rods 172 which extend between the supporting arms 144 and 146 and which are positioned within recesses 174 in the discs, the rods, thereby, acting as keys and the recesses as key-ways.

The working tool portion 170 comprises a rotatable roller 176 which is keyed to the shaft 148 as at 178. A cover 180, connected to the discs 168, covers the entire periphery of the roller 176 except for one small area adjacent the work-piece where an opening 182 is provided in the cover to correspond to recesses 183 formed in the discs 168. The periphery of the roller is machined to a mirror-like finish and is adapted to support thereon a plurality of tiny steel balls 184, similar to those mentioned above in connection with the first embodiment of the invention. The balls are packed tightly around the periphery of the roller by means of a wedge 186 extending into a recess 188 in the roller. The roller 176 has a diameter which is larger than the diameter of the work-piece by an amount at least equal to the width of the wedge 186 so that no unworked area is left on the work-piece. The discs 168 prevent any lateral movement of the balls, while the cover 180 prevents the balls from falling from the roller, the opening 182 being provided at the top of the tool.

The bed 134, upon which the tool carriage is mounted, is, itself, mounted for vertical adjustment on the support base 102 of the stand 100 by means of a screw threaded stem 190 which extends through a gear box 192 on the under-side of the base 102. The stem 190 is vertically adjustable by means of a hand wheel 194 connected to a gear shaft 196. The shaft 196 is provided with a bevel gear 198 which meshes with a bevel gear 200. The gear 200 is internally threaded to mesh with the screw-threads on the stem 190. A dial 202 is provided on the shaft 196 and this dial coincides with an indicating means 203 on the flange 204, this flange also serving as a bearing for the shaft 196. A guide rod 206 is provided at each corner of the bed 134 and these rods slidably extend into openings 208 formed in the support base 102. The rods 206 bear against coil springs 210 which are provided in the bottom of the openings 208.

In operation, the work-piece is placed on the shaft 110 and the tool is brought to bear against the left edge of the silvered surface of the work-piece, as viewed in Fig. 10. The motor 152 is then started and the gearing 116, 118, 122 and 126 provides a synchronous rotation of the work-piece and the tool portion 176. At the end of one complete rotation of the tool, the tool is pulled away from the work-piece just sufficiently to clear the tool from the surface of the work-piece but not enough to entirely disengage the teeth of the gear 126 from the gear 122. This is accomplished by lowering the bed 134 a very slight distance as indicated by the dial 202. This movement not only disengages the tool from the work but stops the motor 152. The hand wheel 140 is then actuated to move the tool to the right for such a distance that the left side of the tool portion 176 slightly overlaps the part of the work-piece embossed previously so that the first row of balls in the tool will enter the last row of recesses previously formed. This distance is set by means of the dial 142. The bed 134 is then moved up again and this automatically starts the motor 152. The automatic stopping and starting of the motor by means of the vertical reciprocation of the bed 134 is controlled by means of any one of a variety of switch systems which are commonly used for similar purposes, and which form no part of this invention.

When the entire silvered periphery of the work-piece has been embossed, the bed 134 is lowered sufficiently to enable the work-piece to be removed from the shaft 110 and a new work-piece to be installed.

The embossed roller 130 is then ready to be used to emboss the lens elements 212 on a film strip 214. This is done by running the film strip over the rotating roller 130, the concave impressions on the roller, formed by the balls 184, generating convex embossments on the film.

Instead of using a narrow tool such as illustrated, it is possible to substitute a tool in the form of a roller equal in dimensions to the work-piece, the principle reason for using the narrow tool being the aforementioned expense of the balls. If such a larger tool is used, the necessity for the elongated gear 126 and the slidable carriage 128 would be eliminated and the machine could, thereby, be much simplified.

In using the plate die, herein disclosed, to emboss a strip of film, the die, shown in either Figs. 8 or 9, is mounted upon any of the common forms of press machines and brought against the film surface while the film is still in a plastic state. The resultant impressions made by the die cavities on the film are in the form of convex, spherical embossments which act as lens elements. Each section of a film strip is treated in this way.

In order to obtain a simpler and more efficient method of embossing the film strip, the roller type die is used. In this method, the die is rotated adjacent a running strip of film, the distance between the die and the film being so arranged that the lands between the die cavities sink into the film material for a predetermined distance depending on the radius of the cavities. In this way, an entire film strip can be embossed in one operation.

Although this invention has been illustrated as used to emboss photographic film, it is not limited to such use. It may, equally as well, be used to emboss spherical lens elements on a movie screen, a sign-board, a television reflector, and various other photographic or optical surfaces.

Obviously, many modifications and variations of the present invention are possible in the light of the above teachings. It is, therefore, to be understood that within the scope of the appended claims the invention may be practiced otherwise than as specifically described.

What is claimed as the invention is:

1. A device for engraving spherical cavities in a die comprising a base, a tool holder mounted on said base, a work holder mounted on said base in spaced relation to said tool holder, means to mount said tool holder and work holder for relative movement toward and from each other, a tool mounted in said tool holder, a die-plate mounted in said work holder, said die-plate being provided with a working surface having a smooth mirror-like finish, and a plurality of minute balls tangent to one another and secured in said tool.

2. A device for engraving spherical cavities in a die comprising a base, a tool block on said base, a tool on said block, said tool comprising a substantially flat member having a recess therein to receive a work-piece, a plurality of balls within said recess, said balls retained in said recess solely by the force of gravity, each of said balls being substantially tangent to the adjacent balls and a work holder mounted on said base for movement toward and away from said tool.

3. The device of claim 2 wherein stop means are provided to limit the movement of the work holder toward the tool.

4. A device for engraving spherical cavities in a die comprising a tool support and a work support, said tool support having a cylindrical tool rotatably mounted thereon, and said work support being adapted to rotatably support a roller-die, said tool support and said work support being relatively movable toward and away from each other, and said tool having a working surface consisting of a plurality of minute balls, each of said balls being substantially tangent to the balls adjacent thereto.

5. A device for engraving spherical cavities in a die comprising a stand, a base mounted on said stand for vertical reciprocation, a carriage slidable on said base, a cylindrical tool on said carriage, said tool being mounted for rotation, a rotatable work holder mounted on said stand in spaced relation to said base, said work holder being adapted to rotatably support a roller-die in engagement with said tool, said tool having a working surface consisting of a plurality of minute balls, each of said balls being substantially tangent to each of the balls adjacent thereto, and means to rotate said tool in synchronism with said work holder.

6. The device of claim 5 wherein said carriage is slidable in an axial direction relative to said tool.

7. A tool for engraving substantially spherical cavities in a roller-die comprising a pair of spaced discs, a cylindrical roller between said discs, the periphery of said roller having a mirror-finish, a cylindrical cover extending between said discs and overlying the periphery of said roller in spaced relationship thereto, a plurality of balls on the periphery of said roller, each of said balls being substantially tangent to its adjacent balls, said balls being positioned between the periphery of said roller and said cover, and an opening in said cover to expose some of said balls in working position.

8. The method of making a die having closely related, substantially spherical cavities therein comprising the steps of grinding the surface of said die to a mirror-finish, coating said die surface with silver, and impressing said silver coated die surface with a surface having a plurality of substantially tangent minute balls thereon.

9. A device for engraving spherical cavities in a die comprising a base, a tool on said base, a work holder on said base, means to mount said tool and work holder for relative movement toward and away from each other, the working area of said tool comprising a first planar surface and a plurality of minute balls in contact with said surface and in tangency to one another, the line of tangency lying in a plane parallel to the first planar surface, and said balls retained on said surface at least in part solely by the force of gravity.

10. The device of claim 9, further including means to mount said tool for rotation.

11. The device of claim 9, wherein said means are means to mount said work holder for movement.

12. The device of claim 9, wherein said means are means to move said tool.

13. A device for engraving spherical cavities in a die comprising a base, a tool block on said base, a tool on said block, said tool comprising a substantially flat member having a recess therein to receive a work piece, a plurality of balls within said recess, each of said balls being substantially tangent to the adjacent balls, a work holder mounted on said base for movement toward and away from said tool, a peripheral ledge within said recess, said ledge having a height equal to slightly more than the diameter of one of said balls and having a width equal to substantially one-half the diameter of one of said balls.

References Cited in the file of this patent
UNITED STATES PATENTS

| | | |
|---|---|---|
| 232,567 | Sylvester | Sept. 21, 1880 |
| 314,543 | Roesgen | Mar. 24, 1885 |
| 318,754 | Latulip | May 26, 1885 |
| 1,010,127 | Dingley | Nov. 28, 1911 |
| 1,168,635 | Hollingsworth | Jan. 18, 1916 |
| 1,347,490 | Beach | July 27, 1920 |
| 1,591,572 | Stimson | July 6, 1926 |
| 1,781,397 | Klocke | Nov. 11, 1930 |
| 1,784,866 | Fahrenwald | Dec. 16, 1930 |
| 1,798,882 | Holtzman | Mar. 31, 1931 |
| 2,075,286 | Jackes | Mar. 30, 1937 |
| 2,304,976 | Watter | Dec. 15, 1942 |
| 2,315,721 | Martin | Apr. 6, 1943 |
| 2,440,963 | Luce | May 4, 1948 |
| 2,507,826 | Spencer | May 16, 1950 |
| 2,527,725 | Hartman | Oct. 31, 1950 |
| 2,691,905 | Onksen | Oct. 19, 1954 |